United States Patent
Sakamoto et al.

(10) Patent No.: US 6,789,909 B2
(45) Date of Patent: Sep. 14, 2004

(54) MIRROR DEVICE FOR VEHICLE

(75) Inventors: Masato Sakamoto, Aichi-ken (JP);
Yoshio Tsujiuchi, Aichi-ken (JP)

(73) Assignee: Kabushiki Kaisha Tokai-Rika-Denki, Aichi-ken (JP)

( * ) Notice: Subject to any disclaimer, the term of this patent is extended or adjusted under 35 U.S.C. 154(b) by 101 days.

(21) Appl. No.: 10/315,247

(22) Filed: Dec. 10, 2002

(65) Prior Publication Data

US 2003/0141429 A1 Jul. 31, 2003

(30) Foreign Application Priority Data

Dec. 12, 2001 (JP) ........................................ 2001-378201

(51) Int. Cl.$^7$ .............................................. G02B 7/182
(52) U.S. Cl. ....................... 359/871; 359/872; 359/873; 359/877
(58) Field of Search ................................ 359/871–873, 359/877; 248/466, 481, 487; 74/89.35, 424.95, 424.78; 198/34, 424, 499

(56) References Cited

U.S. PATENT DOCUMENTS

| | | |
|---|---|---|
| 4,041,793 A | 8/1977 | Repay et al. |
| 4,324,454 A | 4/1982 | Kumai |
| 4,696,555 A | 9/1987 | Enomoto |
| 5,848,554 A | 12/1998 | Kober et al. |

FOREIGN PATENT DOCUMENTS

| | | |
|---|---|---|
| EP | 0 265 973 A1 | 5/1988 |
| EP | 0 269 081 A1 | 6/1988 |
| JP | 5-26638 | 4/1993 |
| JP | 9-100893 | 4/1997 |

OTHER PUBLICATIONS

British Further Search Report (Dated Jun. 5, 2003).
British Search Report (Dated Apr. 30, 2003).

*Primary Examiner*—Mohammad Sikder
(74) *Attorney, Agent, or Firm*—Nixon Peabody, LLP (57) ABSTRACT

A mirror device for a vehicle which is equipped with a mirror surface angle adjusting mechanism. In a door mirror device for a vehicle, a load is applied to a rod drive in an axial direction, a claw member elastically deforms, and an engagement valley of the rod drive rides up over an engagement projection provided at a distal end of the claw member and is moved. Here, given that angles of inclination of two surfaces of the engagement valley, at a mirror side and at a side opposite the mirror, with respect to a direction orthogonal to an axis of the rod drive, are respectively θ1 and θ2, θ1>θ2. In this way, two loads for manually moving the rod drive toward a side opposite the mirror and toward the mirror side can be made to approach substantially a same magnitude.

20 Claims, 9 Drawing Sheets

MIRROR DEVICE FOR VEHICLE

BACKGROUND OF THE INVENTION

1. Field of the Invention

The present invention relates to a mirror device for a vehicle having a mirror surface angle adjusting mechanism of a mirror for viewing a region substantially toward the rear of a vehicle.

2. Description of the Related Art

Generally, a door mirror device for a vehicle has a plate-shaped frame, and is mounted to a vehicle body via the frame. The frame has a mirror surface angle adjusting mechanism. The mechanism main body of the mirror surface angle adjusting mechanism is fixed to the frame, and an inner mirror holder is tiltably supported at the mechanism main body. An outer mirror holder is assembled with the inner mirror holder. The outer mirror holder holds the mirror for viewing the region substantially toward the rear of the vehicle, and covers the side of the mirror which side is toward the front side of the vehicle. Projecting claws are provided at the outer mirror holder. The projecting claws engage with vibration-proofing claws fixed to the frame. Vibrating of the inner mirror holder and the outer mirror holder is suppressed, and chattering of the mirror surface of the mirror is suppressed.

Figure 7:
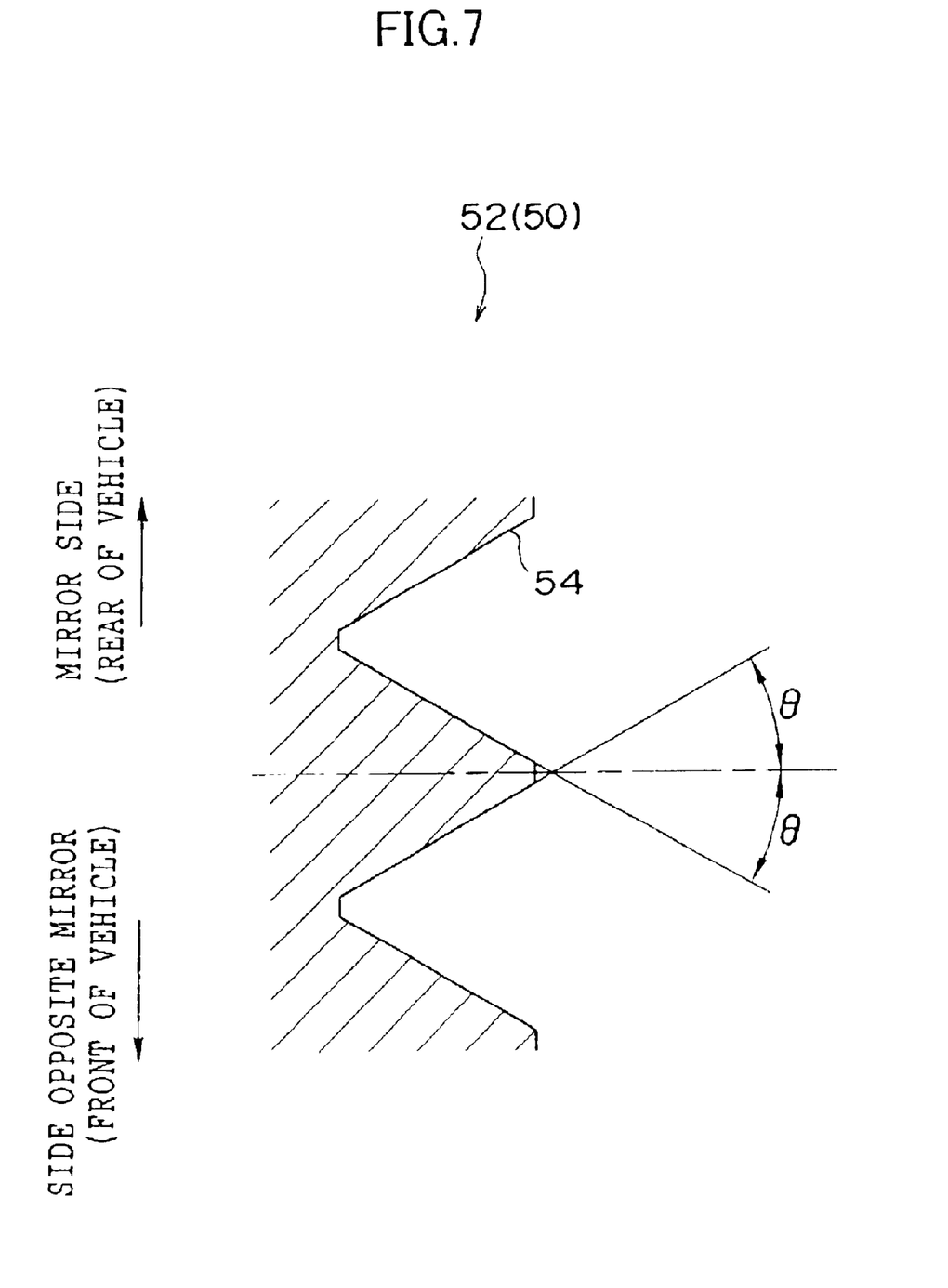
FIG. 7 is a cross-sectional view showing a rod drive in a conventional door mirror device for a vehicle.
Figure 8:
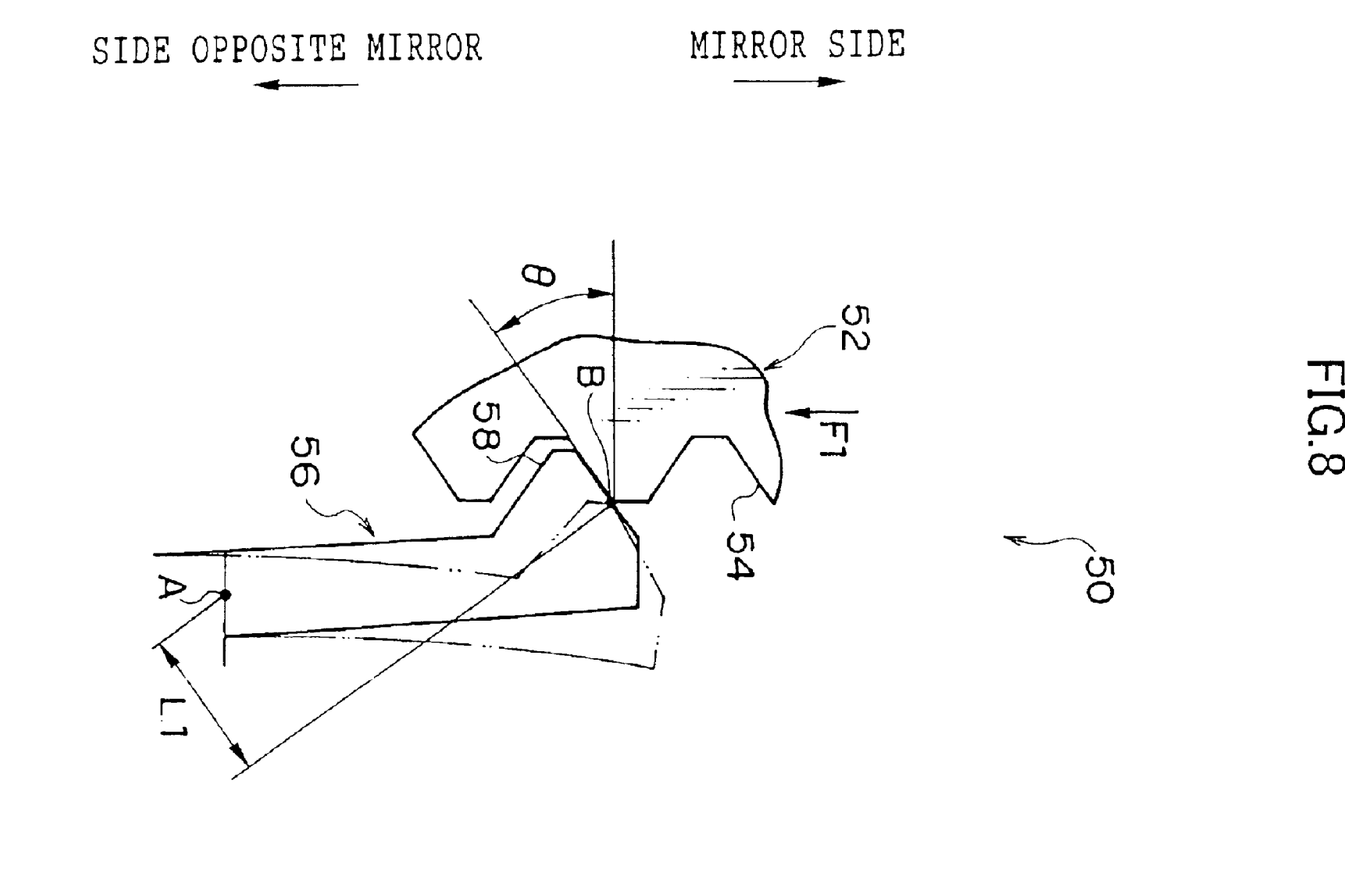
FIG. 8 is a side view showing an engaged state of an engagement valley and an engagement projection at the time when the rod drive is manually moved toward a side opposite a mirror in the conventional door mirror device for a vehicle.
Figure 9:
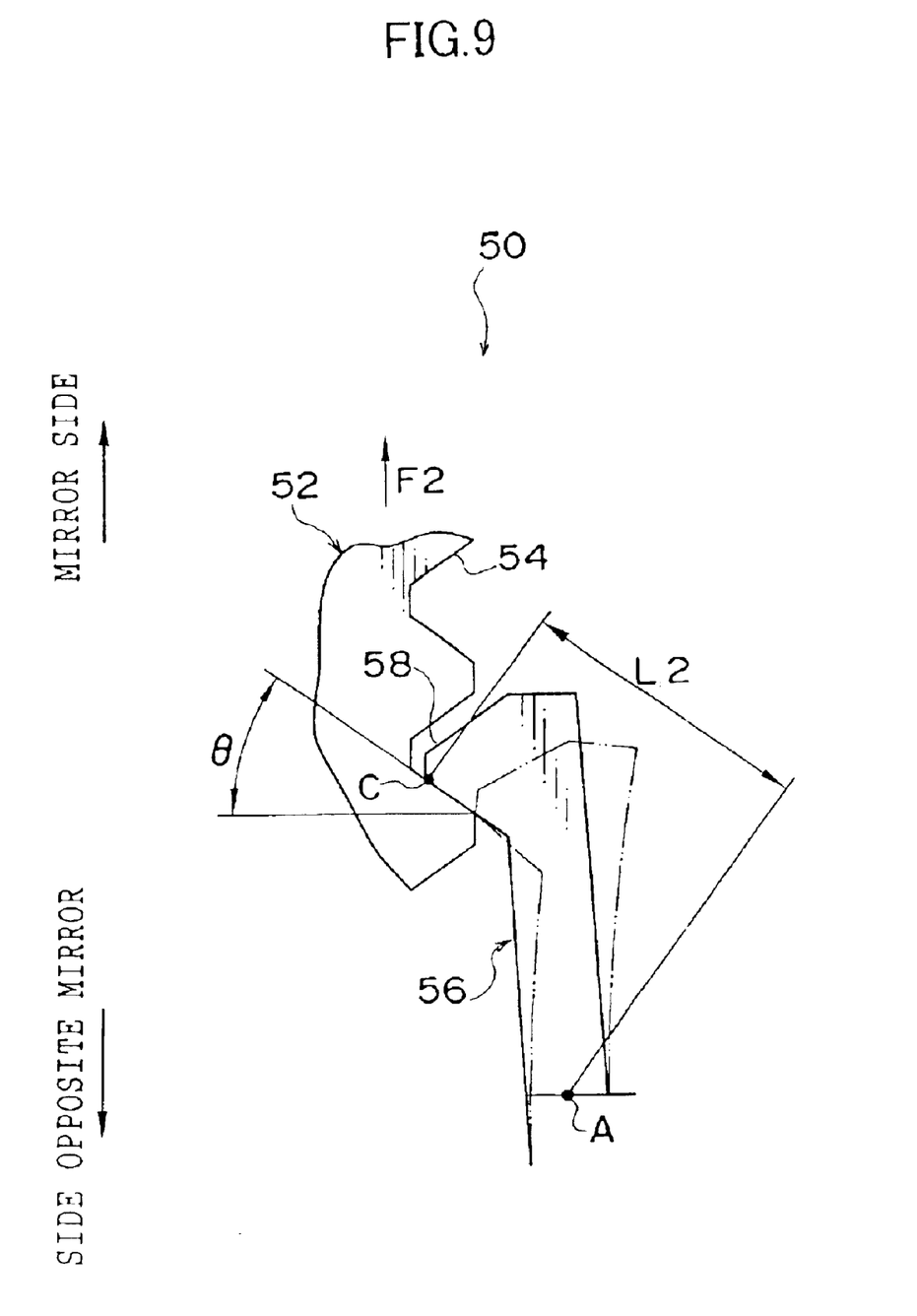
FIG. 9 is a side view showing an engaged state of the engagement valley and the engagement projection at the time when the rod drive is manually moved toward the mirror in the conventional door mirror device for a vehicle.

For example, a pair of shaft-shaped rod drives 52 are provided at the mechanism main body of a door mirror device for a vehicle which is illustrated in FIGS. 7 through 9. A thread, at which a groove having a trapezoidal cross-sectional configuration, i.e., concave engagement valleys 54, is formed in a spiral shape, is formed in the rod drive 52. A plurality of the engagement valleys 54 are provided along the axial direction in the peripheral surface of the rod drive 52. The inner mirror holder is held at the distal ends of the rod drives 52.

A predetermined number of claw members 56 are provided at the periphery of the rod drive 52 within a mechanism main body 66. The claw member 56 is elastic. A convex engagement projection 58, which has a trapezoidal cross-sectional configuration, is formed at the distal end of the claw member 56. The engagement projections 58 engage with the engagement valleys 54, and the predetermined number of claw members 56 thereby support the rod drive 52.

A pair of motors (not illustrated) are provided within the mechanism main body. By driving the motors, the predetermined numbers of claw members 56 rotate around the rod drives 52.

Here, when the motors are driven and the predetermined numbers of claw members 56 rotate around the rod drives 52, the claw members 56 move within the engagement valleys 54. Due to the rod drives 52 being moved automatically in the axial direction, the outer mirror holder and the inner mirror holder are tilted, and the angle of the mirror surface of the mirror is automatically adjusted.

Further, when a predetermined tilting force is applied manually to the mirror, the claw members 56 elastically deform, and the engagement valleys 54 ride up over the engagement projections 58, and the rod drives 52 are moved manually in the axial direction. In this way, the outer mirror holder and the inner mirror holder are tilted, and the angle of the mirror surface of the mirror is adjusted manually.

However, in such a door mirror device 50 for a vehicle, as shown in FIG. 7, the angle of inclination of the mirror side surface of the engagement valley 54 with respect to a direction orthogonal to the axis of the rod drive 52, and the angle of inclination of the surface of the engagement valley 54 at the side opposite the mirror side (i.e., the surface of the engagement valley 54 at the side which is further away from the mirror) with respect to the direction orthogonal to the axis of the rod drive 52, are the same, and are both θ (e.g., 30°).

Thus, a distance L1 (see FIG. 8) in the direction of sliding of the claw member 56 (the engagement projection 58), between a central point A of the base portion (root) of the claw member 56 and a point of abutment B of the engagement valley 54 and the engagement projection 58 at the time when the rod drive 52 is moved toward the side opposite the mirror, is smaller than a distance L2 (see FIG. 9) in the direction of sliding of the claw member 56, between the central point A and a point of abutment C of the engagement valley 54 and the engagement projection 58 at the time when the rod drive 52 is moved toward the mirror. In this way, usually, a load F1 (see FIG. 8), which is applied to the rod drive 52 and which is needed to move the rod drive 52 manually toward the side opposite the mirror, is greater than a load F2 (see FIG. 9), which is applied to the rod drive 52 and which is needed to move the rod drive 52 manually toward the mirror.

If the rigidity of the projecting claws or the vibration-proofing claws is too large, although the ability to suppress chattering of the mirror surface of the mirror can be improved, the resistance (resistance torque) at the time of adjusting the angle of the mirror surface of the mirror is large. Thus, when the rigidities of the projecting claws and the vibration-proofing claws are made to be large, even if an attempt is made to automatically adjust the angle of the mirror surface of the mirror, elastic deformation arises at the claw members 56, and the engagement valleys 54 ride up over the engagement projections 58, and the problem arises that the rod drives 52 cannot move in the axial direction.

When adjusting the angle of the mirror surface of the mirror automatically, in order to prevent the claw members 56 from elastically deforming and the engagement valleys 54 from riding up over the engagement projections 58, the rigidity of the claw members 56 may be made large by increasing the thickness of the claw members 56 or the like. However, if the rigidity of the claw members 56 is made to be large, the loads F1 and F2, which are applied to the rod drive 52 and which are needed in order to manually move the rod drive 52, also become large.

Because F1 is greater than F2 as described above, if the rigidity of the claw members 56 were made large to the extent that F1 were to reach the upper limit value thereof (the limit value at which the rod drive 52 can be manually moved toward the side opposite the mirror), F2 would not reach its upper limit value (the limit value at which the rod drive 52 can be manually moved toward the mirror), and the rigidities of the projecting claws and the vibration-proofing claws could not be made large. (Even if the rigidities of the projecting claws and the vibration-proofing claws were to be made large, when the rod drive 52 was automatically moved, it would not be possible to prevent the claw members 56 from elastically deforming and the engagement valleys 54 from riding up over the engagement projections 58.) On the other hand, even if the rigidity of the claw members 56 was increased to the extent that F2 reached its upper limit value, F1 would exceed its upper limit value, and it would not be possible to move the rod drive 52 manually toward the side opposite the mirror.

Accordingly, the more F1 and F2 can be made to approach the same magnitude, the closer F1 and F2 approach their upper limit values. In this way, the rigidities of the projecting claws and the vibration-proofing claws can be made to be large, and the ability to suppress chattering of the mirror surface of the mirror can be improved. At the same time, the engagement valleys 54 can be prevented from riding up over the engagement projections 58 due to elastic deformation of the claw members 56, at the time when the rod drives 52 are moved automatically. Accordingly, the performances of the door mirror device 50 for a vehicle can be improved.

SUMMARY OF THE INVENTION

In view of the aforementioned, an object of the present invention is to provide a door mirror device for a vehicle in which a load, which is applied to a rod member and which is needed in order for an engagement valley to ride up over an engagement projection due to elastic deformation of a claw member such that the rod member is moved toward a side opposite a mirror, and a load, which is applied to the rod member and which is needed in order for the engagement valley to ride up over the engagement projection due to elastic deformation of the claw member such that the rod member is moved toward the mirror, can be made to approach substantially the same magnitude.

A first aspect of the present invention is a mirror device for a vehicle, the device comprising: a holding member for holding a mirror; a connecting member connected to a vehicle body, and for supporting the holding member such that the holding member is tiltable; an elastically deformable claw member which is provided at the connecting member, the claw member having an engagement projection formed at a distal end portion thereof; and a shaft-shaped rod member having at a peripheral surface thereof a valley-shaped groove extending in a spiral shape along an axial direction of the rod member, one end of the rod member being held at the holding member, and the rod member being supported by the claw member due to the engagement projection being engaged with the groove, wherein the groove has a surface at a side toward a mirror and a surface at a side opposite the mirror, and given that an angle of inclination of the surface at the side toward the mirror, with respect to a direction orthogonal to an axis of the rod member, is $\theta 1$, and an angle of inclination of the surface at the side opposite the mirror, with respect to the direction orthogonal to the axis of the rod member, is $\theta 2$, $\theta 1 > \theta 2$.

The rod member is usually held such that rotation around the axis thereof is not possible. Tilting of the holding member is adjusted in accordance with movement of the rod member in the axial direction. The claw member may be provided substantially parallel to the rod member at a periphery of the rod member. The engagement projection projects toward the rod member, and engages with the groove. The claw member is disposed so as to be rotatable. Due to the claw member being rotated, the rod member is moved in the axial direction. The engagement projection has two surfaces which are a surface, at least a portion of which contacts the surface of the groove located at the side thereof that is toward the mirror, and a surface, at least a portion of which contacts the surface of the groove located at the side thereof that is opposite the mirror. When a load of a predetermined value or greater is applied to the rod member in the axial direction thereof, the claw member elastically deforms, and permits axial direction movement of the rod member.

In the mirror device for a vehicle of the above-described aspect, the holding member, which is tiltably supported at the connecting member connected to the vehicle body, holds the mirror for viewing a region substantially toward the rear of the vehicle. Due to the engagement projection of the claw member provided at the connecting member being engaged with the engagement valley of the peripheral surface of the rod member, the rod member is supported by the claw member, and one end of the rod member is held at the holding member.

Further, the engagement valley is provided due to the groove, i.e., thread mountain (valley), being formed in a spiral shape and extending in the axial direction in the peripheral surface of the rod member. When a predetermined tilting force is applied to the mirror, due to the elastic deformation of the claw member (i.e., because the claw member elastically deforms), the groove (engagement valley) rides up over the engagement projection, and the rod member is moved in the axial direction. In this way, the holding member is tilted, and the mirror surface angle of the mirror is adjusted.

Here, given that the angle of inclination of the mirror side surface of the groove (i.e., the surface of the groove which is nearer to the mirror) with respect to the direction orthogonal to the axis of the rod member is $\theta 1$, and that the angle of inclination of the surface of the groove at the side opposite the mirror (i.e., the surface of the groove which is further away from the mirror) with respect to the direction orthogonal to the axis of the rod member is $\theta 2$, $\theta 1 > \theta 2$. Thus, the distance in the sliding direction of the claw member (the engagement projection) and between the central point of the root of the claw member and the point of abutment of the groove and the engagement projection at the time when the rod member is moved toward the mirror, can be made to approach, more than is the case in the conventional art, the same magnitude as the distance in the sliding direction of the claw member and between the central point of the root of the claw member and the point of abutment of the groove and the engagement projection at the time when the rod member is moved toward the side opposite the mirror. In this way, the load, which is applied to the rod member and which is needed in order for the groove to ride up over the engagement projection due to elastic deformation of the claw member and the rod member to be moved toward the side opposite the mirror, and the load, which is applied to the rod member and which is needed in order for the groove to ride up over the engagement projection due to elastic deformation of the claw member and the rod member to be moved toward the mirror, can be made to approach substantially the same magnitude.

A second aspect of the present invention is a mirror device for a vehicle, the device comprising: a holding member for holding a mirror; a connecting member connected to a vehicle body, and for supporting the holding member such that the holding member is tiltable; an elastically deformable claw member which is provided at the connecting member, the claw member having an engagement projection formed at a distal end portion thereof; and a shaft-shaped rod member having at a peripheral surface thereof a valley-shaped groove extending in a spiral shape along an axial direction of the rod member, one end of the rod member being held at the holding member, and the rod member being supported by the claw member due to the engagement projection being engaged with the groove, wherein when a load of a predetermined value or greater is applied to the rod member in the axial direction thereof, the claw member elastically deforms, the groove rides up over the engagement projection, and movement of the rod member in the axial direction of the rod member is permitted, the groove has a surface at a side toward a mirror and a surface at a side opposite the mirror, and a relative relationship between an angle of inclination θ1 of the surface at the side toward the mirror with respect to a direction orthogonal to an axis of the rod member, and an angle of inclination θ2 of the surface at the side opposite the mirror with respect to the direction orthogonal to the axis of the rod member is determined such that a load, which is applied to the rod member and which is needed in order to move the rod member toward a side opposite the mirror, and a load, which is applied to the rod member and which is needed in order to move the rod member toward the mirror, are substantially a same magnitude.

In the mirror device for a vehicle of the second aspect of the present invention, the relative relationship between θ1 and θ2 is set such that the load, which is applied to the rod member and which is needed in order for the groove to ride up over the engagement projection due to elastic deformation of the claw member and the rod member to be moved toward the side opposite the mirror, and the load, which is applied to the rod member and which is needed in order for the groove to ride up over the engagement projection due to elastic deformation of the claw member and the rod member to be moved toward the mirror, are substantially the same magnitude. Thus, the loads applied to the both rod members can substantially be set to upper limit values (limit values at which the rod member can be moved by the groove riding-up over the engagement projection due to elastic deformation of the claw member).

In the mirror device for a vehicle of either the first or second aspect of the present invention, the engagement projection has two surfaces which are a surface, at least a portion of which contacts the surface of the groove located at the side thereof that is toward the mirror, and a surface, at least a portion of which contacts the surface of the groove located at the side thereof that is opposite the mirror. Namely, the engagement projection also has a surface toward the mirror and a surface at a side opposite the mirror. Given that an angle of inclination of the mirror side surface of the engagement projection with respect to the direction orthogonal to the axis of the rod member is $\phi1$, and an angle of inclination of the surface of the engagement projection at the side opposite the mirror with respect to the direction orthogonal to the axis of the rod member is $\phi2$, $\phi1>\phi2$. By structuring the mirror device for a vehicle in this way, the engagement projection can be made to engage well with a groove which is formed such that $\theta1>\theta2$.

The mirror device for a vehicle of any of the above-described aspects of the present invention may be structured such that $\theta1=\phi1$ and $\theta2=\phi2$. In this case, the engagement projection can engage even better with the groove.

DETAILED DESCRIPTION OF THE PREFERRED EMBODIMENTS

Figure 1:
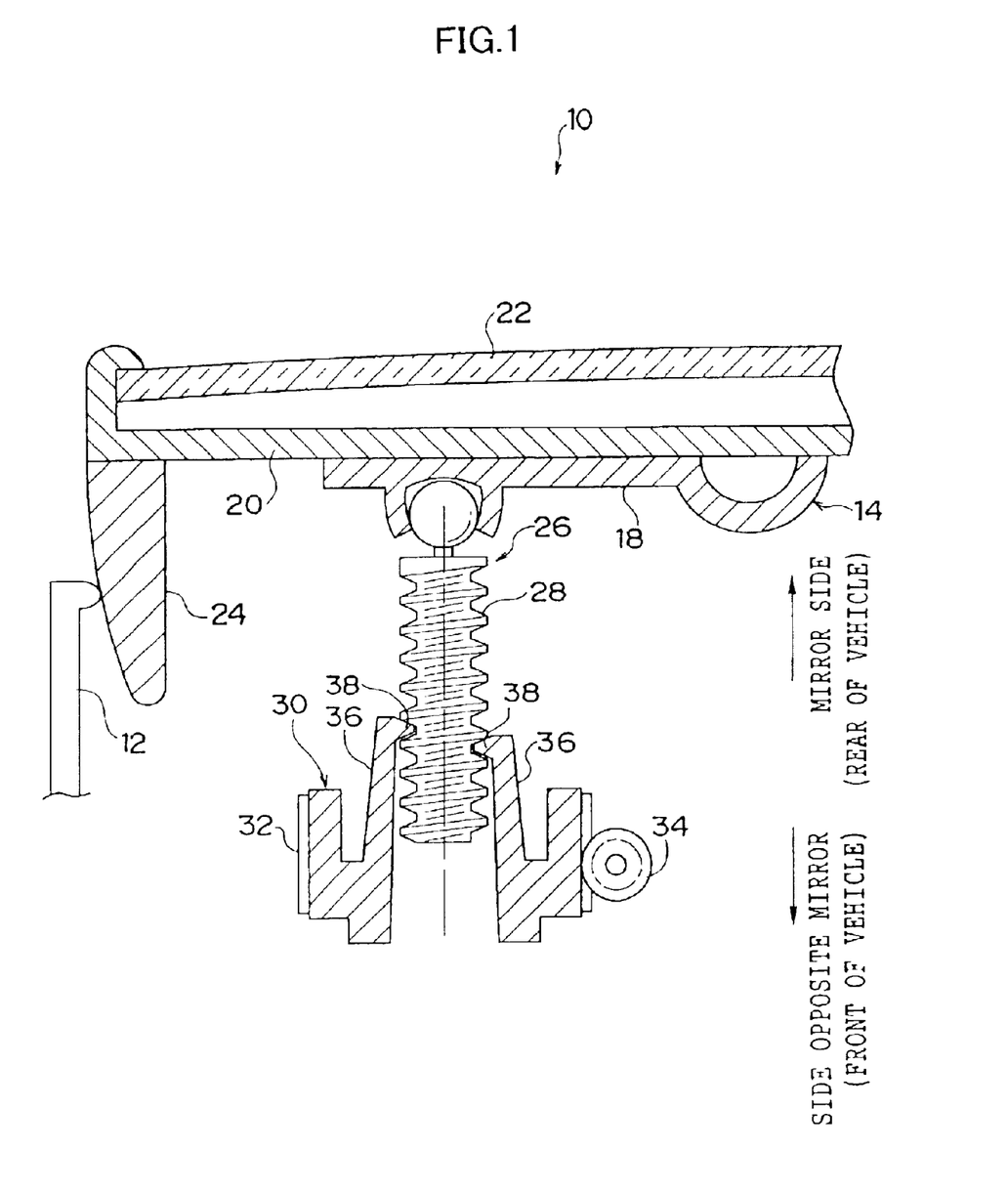
FIG. 1 is a cross-sectional view showing main portions of a door mirror device for a vehicle relating to an embodiment of the present invention.

The main portions of a door mirror device 10 for a vehicle, which is structured by applying the mirror device for a vehicle of the present invention and which relates to an embodiment of the present invention, are illustrated in cross-section in FIG. 1.

The door mirror device 10 for a vehicle relating to the present embodiment has a door mirror stay (not shown). The door mirror stay is fixed to a vehicle door (not shown). A retracting mechanism (not shown) is fixed to the door mirror stay. A plate-shaped frame, which forms a connecting member, is fixed to the retracting mechanism. A door mirror visor (not shown) is fixed to the frame. The door mirror visor covers the retracting mechanism, the frame, a mirror surface angle adjusting mechanism 14 which will be described later, the vehicle front side of an outer mirror holder 20, and the like. Moreover, a predetermined number of vibration-proofing claws 12 are fixed to a vehicle rear side end portion of the frame.

Figure 5:
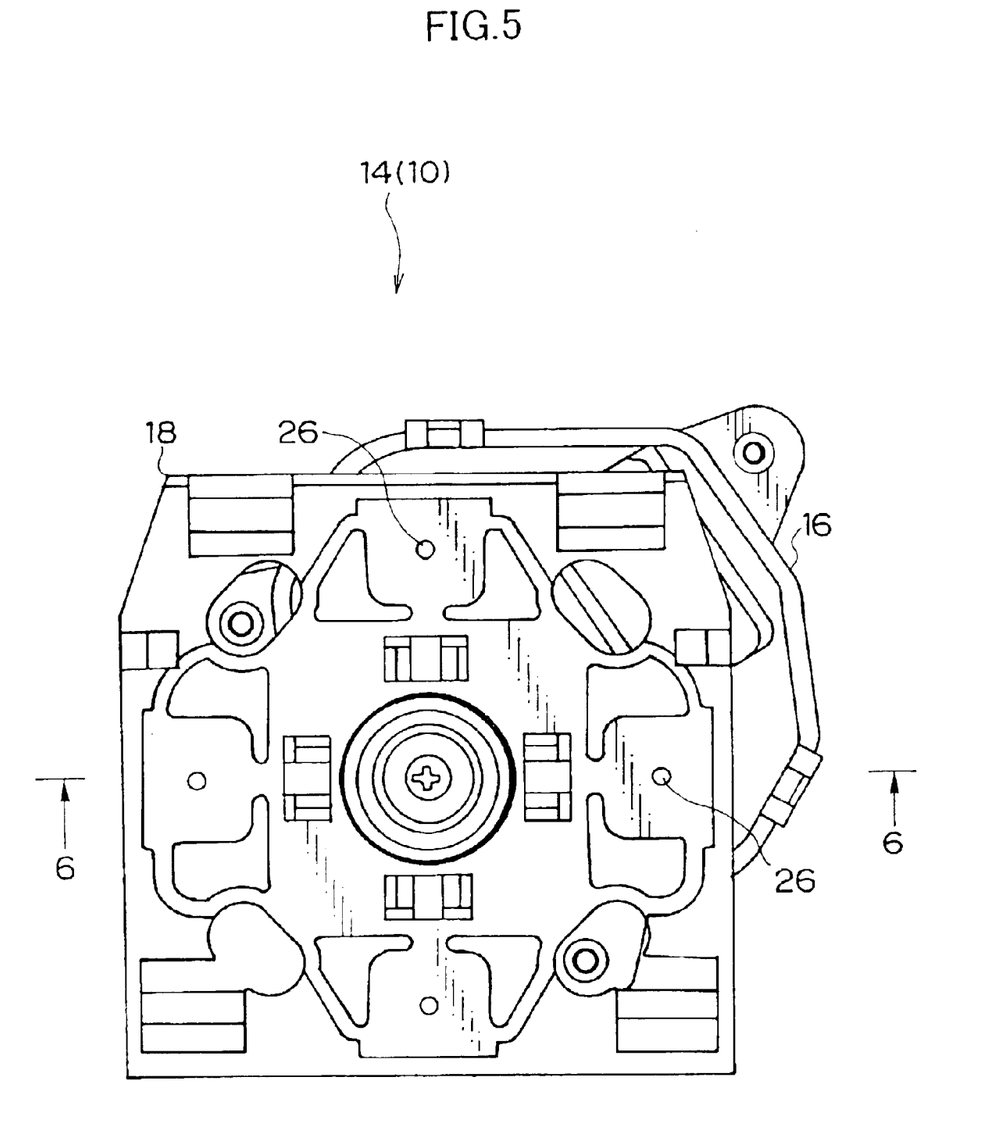
FIG. 5 is a front view showing a mirror surface angle adjusting device in the door mirror device for a vehicle relating to the embodiment of the present invention.
Figure 6:
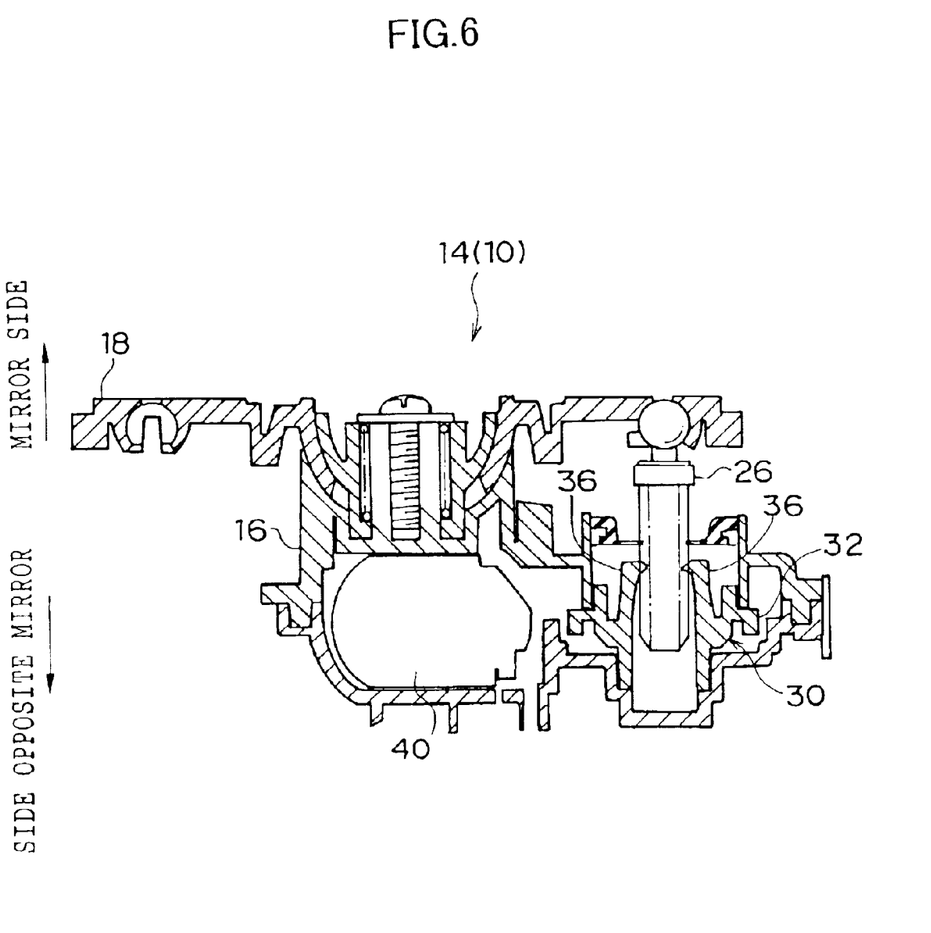
FIG. 6 is a cross-sectional view (taken along line 6—6 in FIG. 5) showing the mirror surface angle adjusting device in the door mirror device for a vehicle relating to the embodiment of the present invention.

The mirror surface angle adjusting mechanism 14, which is illustrated in detail in FIGS. 5 and 6, is provided at the center of the vehicle rear side of the frame. The mirror surface angle adjusting mechanism 14 has a mechanism main body 16 forming a connecting member. The mechanism main body 16 is fixed to the frame. In this way, the frame and the mechanism main body 16 are connected to the vehicle body via the retracting mechanism and the door mirror stay.

An inner mirror holder 18, which is rectangular and plate-shaped and forms a holding member, is tiltably supported at a central region at the vehicle rear side of the mechanism main body 16. An outer mirror holder 20, which forms the holding member, is assembled to the vehicle rear side of the inner mirror holder 18. The outer mirror holder 20 holds a mirror 22 for viewing a region substantially toward the rear of the vehicle, and covers the vehicle front side of the mirror 22. A predetermined number of projecting claws 24 are provided at the vehicle front side of the outer mirror holder 20 so as to correspond to the predetermined number of vibration-proofing claws 12. Due to the projecting claws 24 engaging with the vibration-proofing claws 12, vibrating of the inner mirror holder 18 and the outer mirror holder 20 is suppressed, and chattering of the mirror surface of the mirror 22 is suppressed.

A pair of rod drives 26, which are shaped as substantially solid-cylindrical shafts and serve as rod members, are provided at the mechanism main body 16. The rod drives 26 project toward the rear of the vehicle from the mechanism main body 16. The projecting distal end (one end) of each rod drive 26 is held at the inner mirror holder 18. The inner mirror holder 18 is tiltable with respect to the rod drives 26. Rotation of the rod drives 26 around their axes with respect to the inner mirror holder 18 is not possible. A single groove (engagement valley) 28, which is concave and has trapezoidal cross-sectional configurations, is formed in a spiral form in the region of the rod drive 26 other than the projecting distal end thereof, so as to form a thread. As can be seen from FIG. 2, in cross-section, a plurality of the engagement valleys 28 are formed repeatedly along the axial direction of the rod drive 26.

A pair of substantially hollow-cylindrical wheel drives 30 are provided within the mechanism main body 16 at the peripheries of the rod drives 26. The wheel drive 30 is freely rotatable. A helical gear 32 is provided at the outer peripheral region of the wheel drive 30, and a worm 34 meshes with the helical gear 32. A predetermined number of claw members 36, which have substantially rectangular cross-sections, are provided integrally at the inner side of the helical gear 32. The claw members 36 are formed of POM (polyoxymethylene), and are elastic. An engagement projection 38, which is convex and has a trapezoidal cross-section, is formed at the distal end of the claw member 36. Due to the engagement projections 38 engaging with the engagement valleys 28 of the rod drive 26 (e.g., due to the both side surfaces of the engagement projections 38 fitting together with the both side surfaces of the engagement valleys 28), the predetermined number of claw members 36 support the rod drive 26.

A pair of motors 40 are provided within the mechanism main body 16 in correspondence with the worms 34. Due to the motor 40 being driven, the worm 34 is rotated, and the wheel drive 30 (the helical gear 32 and the predetermined number of claw members 36) rotates around the rod drive 26.

Here, when the motors 40 are driven and the wheel drives 30 rotate around the rod drives 26, the claw members 36 move within the engagement valleys 28, and the rod drives 26 are automatically moved in the axial direction. The outer mirror holder 20 and the inner mirror holder 18 are thereby tilted, and the angle of the mirror surface of the mirror 22 is adjusted automatically.

When a predetermined tilting force is applied manually to the mirror 22, the engagement valleys 28 ride over the engagement projections 38 due to elastic deformation (flexure) of the claw members 36, and the rod drives 26 are manually moved in the axial direction. In this way, the outer mirror holder 20 and the inner mirror holder 18 are tilted, and the angle of the mirror surface of the mirror 22 is adjusted manually.

Figure 2:
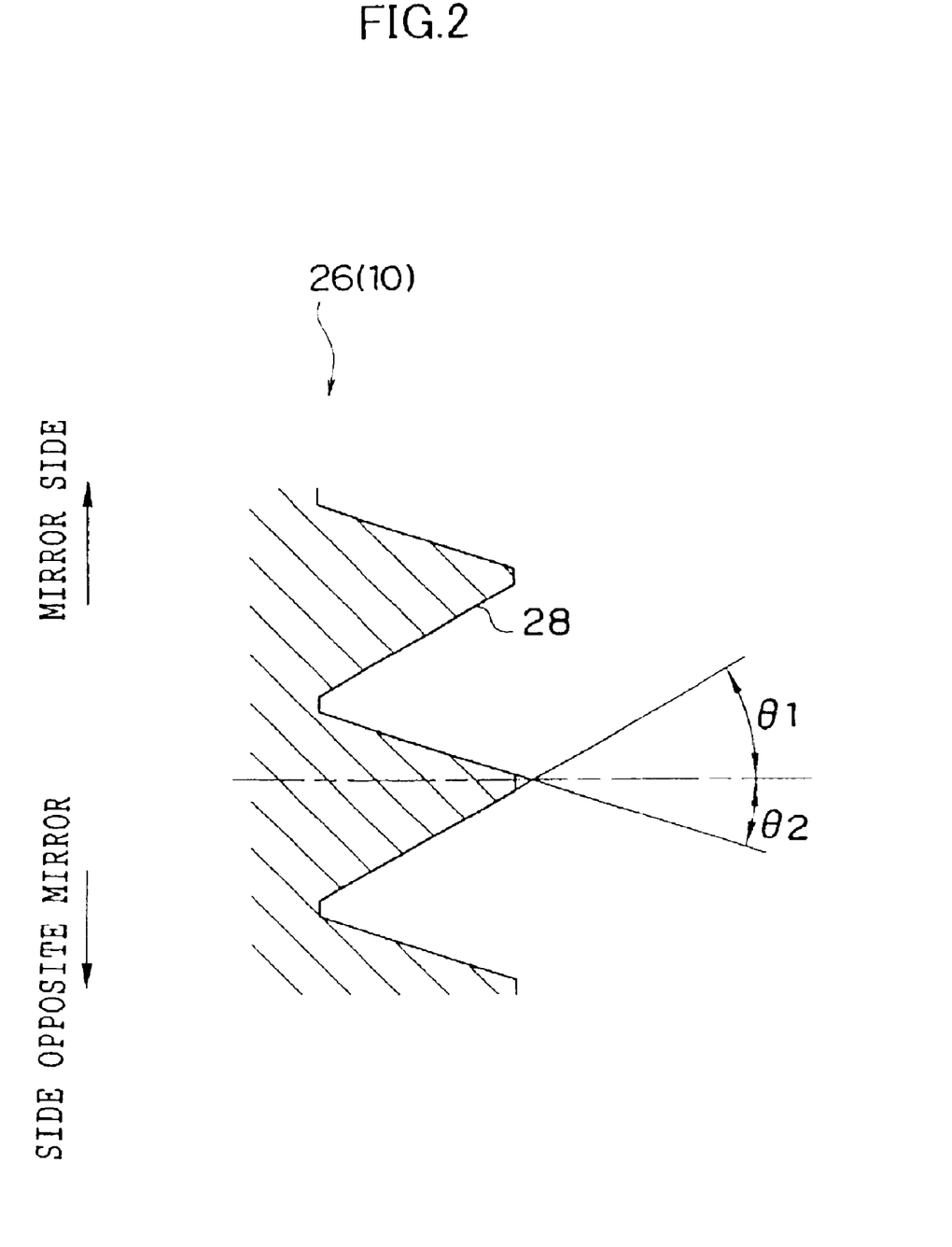
FIG. 2 is a cross-sectional view showing a rod drive in the door mirror device for a vehicle relating to the embodiment of the present invention.

Here, as shown in FIG. 2, given that an angle of inclination of the mirror 22 side surface of the engagement valley 28 with respect to a direction orthogonal to the axis of the rod drive 26 is $\theta 1$, and that an angle of inclination of the surface at the side opposite the mirror 22 of the engagement valley 28 with respect to the direction orthogonal to the axis of the rod drive 26 is $\theta 2$, $\theta 1 > \theta 2$. Further, in the present embodiment, when, for example, $\theta 1$ is 30° and $\theta 2$ is 18°, a load F1 (see FIG. 3), which is applied to the rod drive 26 and which is needed in order for the rod drive 26 to be moved manually toward the side opposite the mirror 22, and a load F2 (see FIG. 4), which is applied to the rod drive 26 and which is needed in order for the rod drive 26 to be moved toward the mirror 22, are substantially the same magnitude.

Moreover, given that an angle of inclination of the mirror 22 side surface of the engagement projection 38 with respect to the direction orthogonal to the axis of the rod drive 26 is $\phi 1$ (see FIG. 3), and that an angle of inclination of the surface of the engagement projection 38 at the side opposite the mirror 22 with respect to the direction orthogonal to the axis of the rod drive 26 is $\phi 2$ (see FIG. 4), $\phi 1 > \phi 2$. (For example, $\theta 1 = \phi 1$, and $\theta 2 = \phi 2$.)

Next, operation of the present embodiment will be described.

In the door mirror device 10 for a vehicle having the above-described structure, the outer mirror holder 20, which is tiltably supported via the inner mirror holder 18 at the mechanism main body 16 which is connected to the vehicle body, holds the mirror 22 for viewing the region substantially to the rear of the vehicle. The engagement projections 38 of the predetermined number of claw members 36 provided at the wheel drives 30 within the mechanism main body 16, engage with the engagement valleys 28 of the peripheral surfaces of the rod drives 26. The rod drives 26 are supported by the predetermined numbers of claw members 36, and the projecting distal ends of the rod drives 26 are held at the inner mirror holder 18.

The engagement valleys 28 of the rod drives 26 are formed in spiral shapes. Therefore, when the motors 40 are driven and the wheel drives 30 rotate around the rod drives 26, the claw members 36 move within the engagement valleys 28. In this way, the rod drives 26 move automatically in the axial directions thereof, and the outer mirror holder 20 and the inner mirror holder 18 are tilted, and the angle of the mirror surface of the mirror 22 is automatically adjusted.

Moreover, a plurality of the engagement valleys 28 of the rod drives 26 are provided along the axial directions thereof. When a predetermined tilting force is applied manually to the mirror 22, the claw members 36 elastically deform, the engagement valleys 28 ride up over the engagement projections 38, and the rod drives 26 are moved manually in the axial directions. In this way, the outer mirror holder 20 and the inner mirror holder 18 are tilted, and the angle of the mirror surface of the mirror 22 is manually adjusted.

Figure 3:
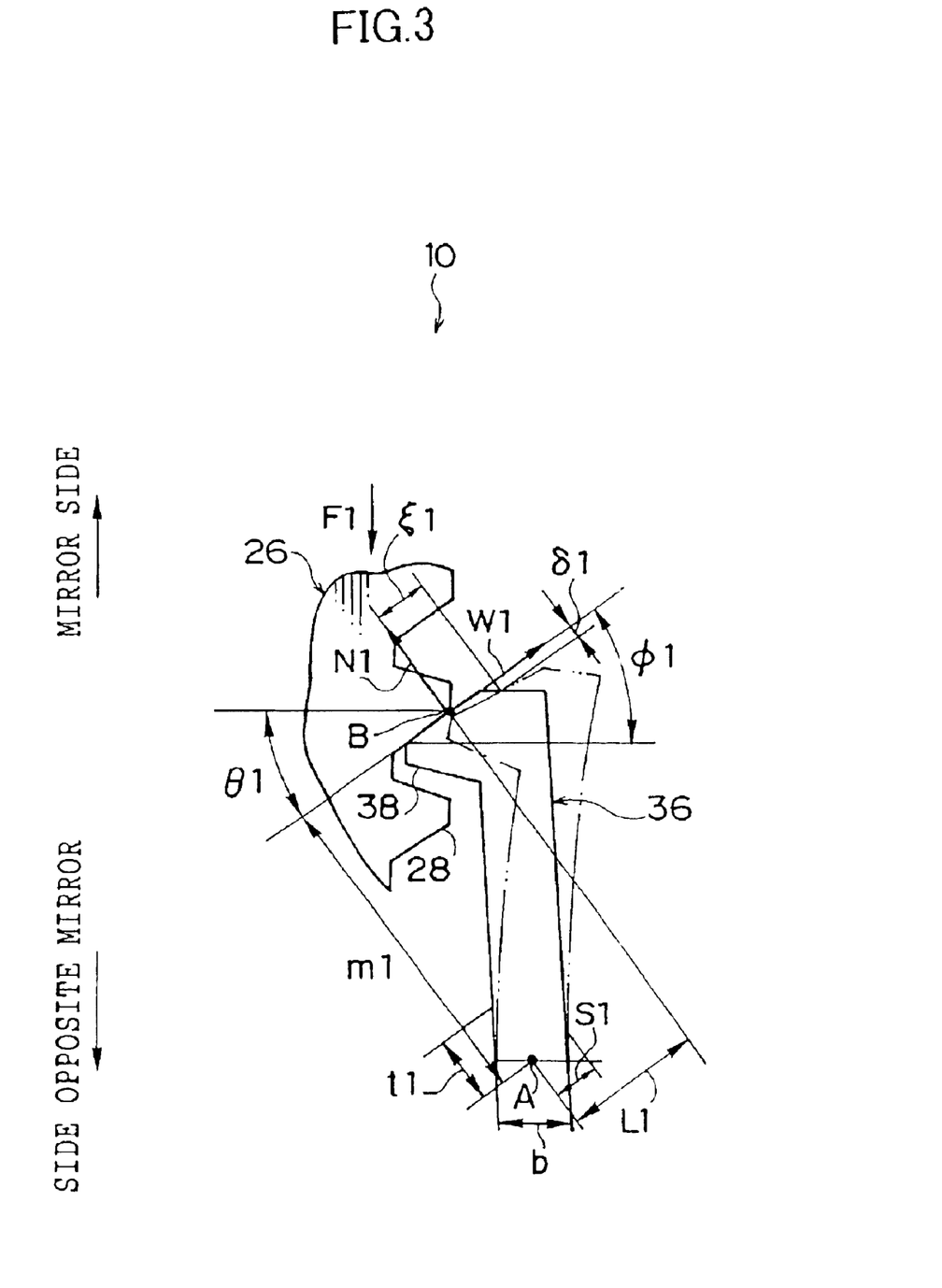
FIG. 3 is a side view showing an engaged state of an engagement valley and an engagement projection at the time when the rod drive is manually moved toward a side opposite a mirror in the door mirror device for a vehicle relating to the embodiment of the present invention.
Figure 4:
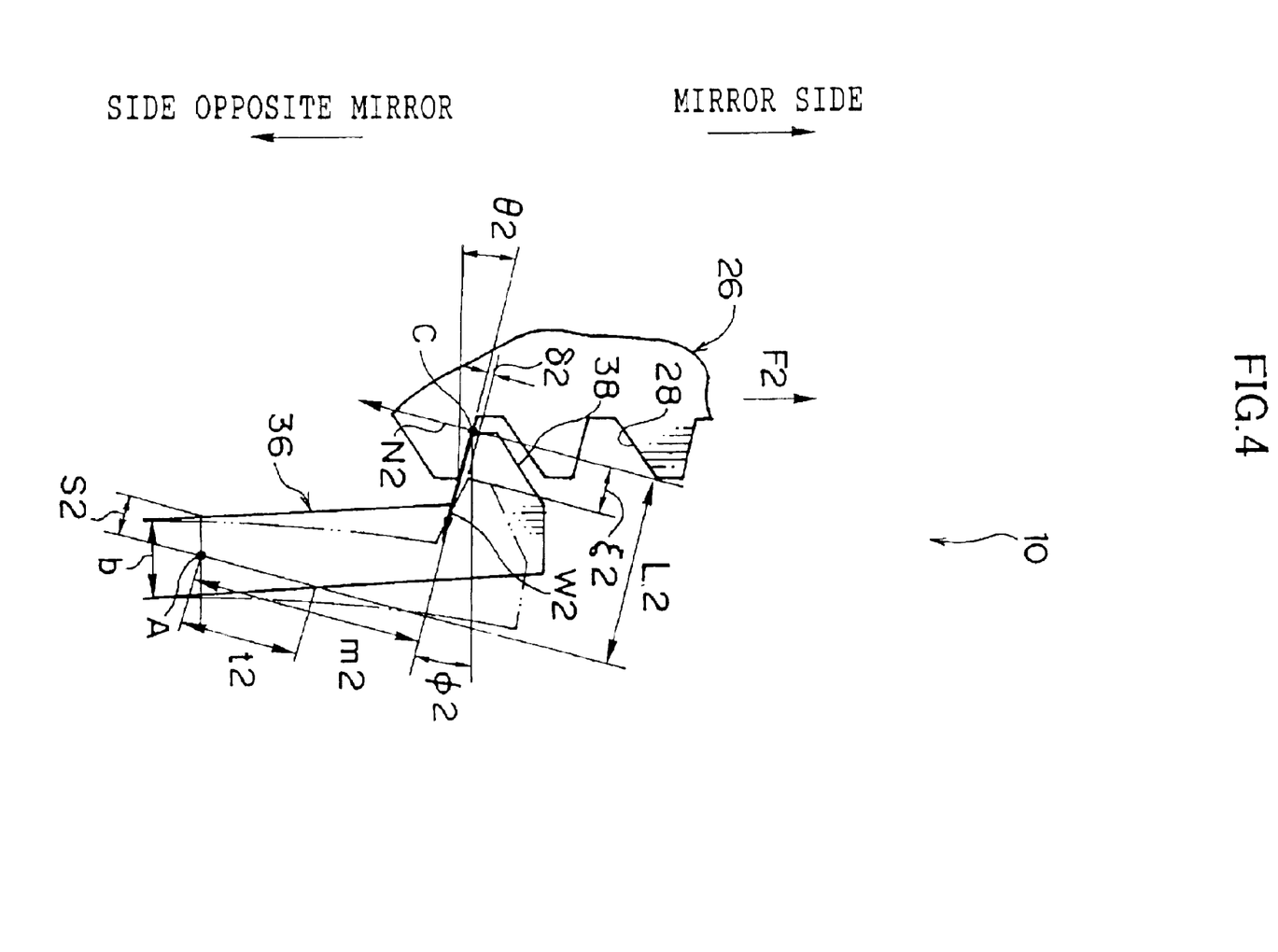
FIG. 4 is a side view showing an engaged state of the engagement valley and the engagement projection at the time when the rod drive is moved manually toward the mirror in the door mirror device for a vehicle relating to the embodiment of the present invention.

Here, as shown in FIG. 2, the angle of inclination $\theta 1$ of the mirror 22 side surface of the engagement valley 28 with respect to the direction orthogonal to the axis of the rod drive 26, and the angle of inclination $\theta 2$ of the surface far from the mirror 22 of the engagement valley 28 with respect to the direction orthogonal to the axis of the rod drive 26, are formed such that $\theta 1 > \theta 2$. Therefore, as shown in FIGS. 3 and 4, the distance L1 in the direction of sliding of the claw member 36 (the engagement projection 38), between the central point A of the root of the claw member 36 and the point of abutment B of the engagement valley 28 and the engagement projection 38 at the time when the rod drive 26 is manually moved toward the side opposite the mirror 22, and the distance L2 in the direction of sliding of the claw member 36, between the central point A of the root of the claw member 36 and the point of abutment C of the engagement valley 28 and the engagement projection 38 at the time when the rod drive 26 is manually moved toward the mirror 22, are made to approach the same magnitude, as compared with the conventional art. In this way, the load F1 (see FIG. 3), which is applied to the rod drive 26 and which is needed in order for the rod drive 26 to be moved manually toward the side opposite the mirror 22, and the load F2 (see FIG. 4), which is applied to the rod drive 26 and which is needed in order for the rod drive 26 to be moved manually toward the mirror 22, can be made to approach the same magnitude. Thus, the rigidity of the claw members 36 can be increased by increasing the thickness of the claw members 36 or the like, and F1 and F2 can be made to approach their upper limit values (limit values at which the rod drive 26 can be moved manually due to the engagement valleys 28 riding over the engagement projections 38 due to the claw members 36 elastically deforming).

In this way, by making the rigidities of the projecting claws 24 and the vibration-proofing claws 12 large, chattering of the mirror surface of the mirror 22 can be reduced. At the same time, regardless of the increase in the resistance (resistance torque) at the time of adjusting the angle of the mirror surface of the mirror 22, when the angle of the mirror surface of the mirror 22 is automatically adjusted, the engagement valleys 28 can be prevented from riding over the engagement projections 38 due to elastic deformation of the claw members 36. Accordingly, the performances of the door mirror device 10 for a vehicle can be improved.

Moreover, when, for example, θ1 is 30° and θ2 is 18°, F1 and F2 are substantially the same magnitude. Thus, both F1 and F2 can substantially be set to their upper limit values. In this way, by making the rigidities of the projecting claws 24 and the vibration-proofing claws 12 even greater, the ability to suppress chattering of the mirror surface of the mirror 22 can be improved even more. At the same time, when the angle of the mirror surface of the mirror 22 is adjusted automatically, it is possible to prevent even more the engagement valleys 28 from riding over the engagement projections 38 due to elastic deformation of the claw members 36. Accordingly, the performances of the door mirror device 10 for a vehicle can be improved even more.

Here, as shown in FIGS. 3 and 4, because φ1>φ2, the engagement projections 38 can engage well with the engagement valleys 28 which are formed such that θ1>θ2.

Moreover, when θ1=φ1 and θ2=φ2, the engagement projections 38 can engage even better with the engagement valleys 28.

In the present embodiment, the mirror device for a vehicle of the present invention is applied to the door mirror device 10 for a vehicle. However, the mirror device for a vehicle of the present invention can be applied to a fender mirror device for a vehicle, or an inner mirror device for a vehicle, or the like.

(Computational Example)

Next, a computational example in the present embodiment will be described.

As shown in FIG. 3, given that the load which is applied to the rod drive 26 and which is needed for the rod drive 26 to manually be moved toward the side opposite the mirror 22 is F1, the vertical resistance applied to the rod drive 26 from the claw member 36 is N1, the load in the sliding direction of the claw member 36 which is applied to the rod drive 26 from the claw member 36 at the time when engagement of the engagement valley 28 and the engagement projection 38 is canceled is W1, the angle of inclination of the mirror 22 side surface of the engagement valley 28 with respect to the direction orthogonal to the axis of the rod drive 26 is θ1, and the coefficient of friction between the rod drive 26 and the claw member 36 is μ, the following relationship is established.

$$F1 \cdot \sin(\theta 1) = W1 + \mu \cdot N1$$

Further, given that the central point of the root of the claw member 36 is A, the point of abutment between the engagement valley 28 and the engagement projection 38 at the time when the rod drive 26 is moved manually toward the side opposite to the mirror 22 is B, the distance between point A and point B in the sliding direction of the claw member 36 is L1, the thickness of the claw member 36 in the sliding direction of the claw member 36 from point A is s1, the width of the root of the claw member 36 is b, the amount of elastic deformation of the claw member 36 in the sliding direction of the claw member 36 at the time when engagement of the engagement valley 28 and the engagement projection 38 is canceled is ξ1, the geometrical moment of inertia of the root of the claw member 36 is J1, the shape factor of the claw member 36 is K, and the Young's modulus of the claw member 36 (POM) is E, the following are established.

$$W1 = \frac{K \cdot E \cdot J1 \cdot \xi 1}{(L1)^3}$$

$$J1 = \frac{b \cdot (s1)^3}{12}$$

Accordingly, $$W1 = \frac{K \cdot E \cdot b \cdot (s1)^3 \cdot \xi 1}{12(L1)^3}$$

Further, given that the distance between point A and point B in the direction of the vertical resistance N1 is m1, the thickness of the claw member 36 from point A and in the direction of the vertical resistance N1 is t1, the amount of elastic deformation of the claw member 36 in the direction of the vertical resistance N1 at the time when engagement of the engagement valley 28 and the engagement projection 38 is cancelled is δ1, and the geometrical moment of inertia of the root of the claw member 36 is I1, the following are established.

$$N1 = \frac{K \cdot E \cdot I1 \cdot \delta 1}{(m1)^3}$$

$$I1 = \frac{b \cdot (t1)^3}{12}$$

Accordingly, $$N1 = \frac{K \cdot E \cdot b \cdot (t1)^3 \cdot \delta 1}{12(m1)^3}$$

Therefore, $$F1 = \frac{K \cdot E \cdot b}{12} \left[ \frac{(s1)^3 \cdot \xi 1}{(L1)^3} + \frac{\mu \cdot (t1)^3 \cdot \delta 1}{(m1)^3} \right] \times \frac{1}{\sin(\theta 1)}$$

Note that, because the engagement valleys 28 twist in a spiral shape, the respective dimensions shown in FIG. 3 must take into consideration the twist angle of the engagement valleys 28.

On the other hand, as shown in FIG. 4, given that the load which is applied to the rod drive 26 and which is needed in order for the rod drive 26 to be manually moved toward the mirror 22 is F2, the vertical resistance applied to the rod drive 26 from the claw member 36 is N2, the load in the sliding direction of the claw member 36 which is applied to the rod drive 26 from the claw member 36 when engagement of the engagement valley 28 and the engagement projection 38 is cancelled is W2, and the angle of inclination of the mirror 22 side surface of the engagement valley 28 with respect to the direction orthogonal to the axis of the rod drive 26 is θ2, the following relationship is established.

$$F2 \cdot \sin(\theta 2) = W2 + \mu \cdot N2$$

Moreover, given that a point of abutment of the engagement valley 28 and the engagement projection 38 at the time when the rod drive 26 is moved manually toward the mirror 22 is C, a distance between point A and point C in the sliding direction of the claw member 36 is L2, the thickness of the claw member 36 from point A and in the sliding direction of the claw member 36 is s2, the amount of elastic deformation of the claw member 36 in the sliding direction of the claw member 36 at the time when engagement of the engagement valley 28 and the engagement projection 38 is canceled is ξ2, and the geometrical moment of inertia of the root of the claw member 36 is J2, the following relationships are established.

$$W2 = \frac{K \cdot E \cdot J2 \cdot \xi 2}{(L2)^3}$$

$$J2 = \frac{b \cdot (s2)^3}{12}$$

Accordingly, $$W2 = \frac{K \cdot E \cdot b \cdot (s2)^3 \cdot \xi 2}{12(L2)^3}$$

Moreover, given that the distance between point A and point B in the direction of the vertical resistance N2 is m2, the thickness of the claw member 36 from point A and in the direction of the vertical resistance N2 is t2, the amount of elastic deformation of the claw member 36 in the direction of the vertical resistance N2 at the time when engagement of the engagement valley 28 and the engagement projection 38 is cancelled is δ2, and the geometrical moment of inertia of the root of the claw member 36 is I2, the following are established.

$$N2 = \frac{K \cdot E \cdot I2 \cdot \delta 2}{(m2)^3}$$

$$I2 = \frac{b \cdot (t2)^3}{12}$$

Accordingly, $$N2 = \frac{K \cdot E \cdot b \cdot (t2)^3 \cdot \delta 2}{12(m2)^3}$$

Therefore, $$F2 = \frac{K \cdot E \cdot b}{12} \left[ \frac{(s2)^3 \cdot \xi 2}{(L2)^3} + \frac{\mu \cdot (t2)^3 \cdot \delta 2}{(m2)^3} \right] \times \frac{1}{\sin(\theta 2)}$$

Note that, in the same way as F1, the respective dimensions shown in FIG. 4 as well must take into consideration the twist angle of the engagement valleys 28.

Accordingly, the condition by which F1=F2 is the following.

$$\left[ \frac{(s1)^3 \cdot \xi 1}{(L1)^3} + \frac{\mu \cdot (t1)^3 \cdot \delta 1}{(m1)^3} \right] \times \frac{1}{\sin(\theta 1)} = \left[ \frac{(s2)^3 \cdot \xi 2}{(L2)^3} + \frac{\mu \cdot (t2)^3 \cdot \delta 2}{(m2)^3} \right] \times \frac{1}{\sin(\theta 2)}$$

In the mirror device for a vehicle of the first aspect of the present invention, because θ1>θ2, the load, which is applied to the rod member and which is needed in order for the engagement valley to ride up over the engagement projection due to elastic deformation of the claw member such that the rod member is moved toward the side opposite the mirror, and the load, which is applied to the rod member and which is needed in order for the engagement valley to ride up over the engagement projection due to elastic deformation of the claw member such that the rod member is moved toward the mirror, can be made to approach substantially the same magnitude.

In the mirror device for a vehicle of the second aspect of the present invention, the relative relationship between θ1 and θ2 is such that the load, which is applied to the rod member and which is needed in order for the engagement valley to ride up over the engagement projection due to elastic deformation of the claw member such that the rod member is moved toward the side opposite the mirror, and the load, which is applied to the rod member and which is needed in order for the engagement valley to ride up over the engagement projection due to elastic deformation of the claw member such that the rod member is moved toward the mirror, are substantially the same magnitude. Thus, the loads applied to both rod members can substantially be set to upper limit values.

In the mirror devices for a vehicle of the first and second aspects of the present invention, by also adding the condition that ϕ1>ϕ2, the engagement projection can be made to engage well with the engagement valley.

Moreover, if θ1=ϕ1 and θ2=ϕ2, the engagement projection can be made to engage even better with the engagement valley.

What is claimed is:

1. A mirror device for a vehicle, the device comprising:
 a holding member for holding a mirror;
 a connecting member connected to a vehicle body, and for supporting the holding member such that the holding member is tiltable;
 an elastically deformable claw member which is provided at the connecting member, the claw member having an engagement projection formed at a distal end portion thereof; and
 a shaft-shaped rod member having at a peripheral surface thereof a valley-shaped groove extending in a spiral shape along an axial direction of the rod member, one end of the rod member being held at the holding member, and the rod member being supported by the claw member due to the engagement projection being engaged with the groove,
 wherein the groove has a surface at a side toward a mirror and a surface at a side opposite the mirror, and given that an angle of inclination of the surface at the side toward the mirror, with respect to a direction orthogonal to an axis of the rod member, is θ1, and an angle of inclination of the surface at the side opposite the mirror, with respect to the direction orthogonal to the axis of the rod member, is θ2, θ1>θ2.

2. The mirror device for a vehicle of claim 1, wherein tilting of the holding member is adjusted in accordance with movement of the rod member in the axial direction thereof.

3. The mirror device for a vehicle of claim 1, wherein the rod member is held such that rotation around the axis of the rod member is impossible.

4. The mirror device for a vehicle of claim 1, wherein the claw member is disposed so as to be rotatable at a periphery of the rod member, and due to the claw member being rotated, the claw member moves the rod member in the axial direction thereof.

5. The mirror device for a vehicle of claim 1, wherein the claw member is disposed at a periphery of the rod member and substantially parallel to the rod member, and the engagement projection projects toward the rod member and engages with the groove.

6. The mirror device for a vehicle of claim 1, wherein the engagement projection has two surfaces which are a surface, at least a portion of which contacts the surface of the groove located at the side thereof that is toward the mirror, and a surface, at least a portion of which contacts the surface of the groove located at the side thereof that is opposite the mirror.

7. The mirror device for a vehicle of claim 1, further comprising a motor which is connected to the claw member and capable of rotationally driving the claw member.

8. The mirror device for a vehicle of claim 1, wherein when a load of a predetermined value or greater is applied to the rod member in the axial direction thereof, the claw member elastically deforms and permits movement of the rod member in the axial direction thereof.

9. A mirror device for a vehicle, the device comprising:
a holding member for holding a mirror;
a connecting member connected to a vehicle body, and for supporting the holding member such that the holding member is tiltable;
an elastically deformable claw member which is provided at the connecting member, the claw member having an engagement projection formed at a distal end portion thereof; and
a shaft-shaped rod member having at a peripheral surface thereof a valley-shaped groove extending in a spiral shape along an axial direction of the rod member, one end of the rod member being held at the holding member, and the rod member being supported by the claw member due to the engagement projection being engaged with the groove, wherein when a load of a predetermined value or greater is applied to the rod member in the axial direction thereof, the claw member elastically deforms, the groove rides up over the engagement projection, and movement of the rod member in the axial direction of the rod member is permitted,
the groove has a surface at a side toward a mirror and a surface at a side opposite the mirror, and
a relative relationship between an angle of inclination $\theta 1$ of the surface at the side toward the mirror with respect to a direction orthogonal to an axis of the rod member, and an angle of inclination $\theta 2$ of the surface at the side opposite the mirror with respect to the direction orthogonal to the axis of the rod member is determined such that a load, which is applied to the rod member and which is needed in order to move the rod member toward a side opposite the mirror, and a load, which is applied to the rod member and which is needed in order to move the rod member toward the mirror, are substantially a same magnitude.

10. The mirror device for a vehicle of claim 9, wherein tilting of the holding member is adjusted in accordance with movement of the rod member in the axial direction thereof.

11. The mirror device for a vehicle of claim 9, wherein the rod member is held such that rotation around the axis of the rod member is impossible.

12. The mirror device for a vehicle of claim 9, wherein the claw member is disposed so as to be rotatable at a periphery of the rod member, and due to the claw member being rotated, the claw member moves the rod member in the axial direction thereof.

13. The mirror device for a vehicle of claim 9, wherein the claw member is disposed at a periphery of the rod member and substantially parallel to the rod member, and the engagement projection projects toward the rod member and engages with the groove.

14. The mirror device for a vehicle of claim 9, wherein the engagement projection has two surfaces which are a surface, at least a portion of which contacts the surface of the groove located at the side thereof that is toward the mirror, and a surface, at least a portion of which contacts the surface of the groove located at the side thereof that is opposite the mirror.

15. The mirror device for a vehicle of claim 6, wherein given that an angle of inclination, with respect to the direction orthogonal to the axis of the rod member, of the surface of the engagement projection, at least a portion of which contacts the surface of the groove at the side toward the mirror, is $\phi 1$, and an angle of inclination, with respect to the direction orthogonal to the axis of the rod member, of a surface of the engagement projection, at least a portion of which contacts the surface of the groove at the side opposite the mirror, is $\phi 2$, $\phi 1 > \phi 2$.

16. The mirror device for a vehicle of claim 14, wherein given that an angle of inclination, with respect to the direction orthogonal to the axis of the rod member, of the surface of the engagement projection, at least a portion of which contacts the surface of the groove at the side toward the mirror, is $\phi 1$, and an angle of inclination, with respect to the direction orthogonal to the axis of the rod member, of a surface of the engagement projection, at least a portion of which contacts the surface of the groove at the side opposite the mirror, is $\phi 2$, $\phi 1 > \phi 2$.

17. The mirror device for a vehicle of claim 15, wherein, substantially, $\theta 1 = \phi 1$ and $\theta 2 = \phi 2$.

18. The mirror device for a vehicle of claim 16, wherein, substantially, $\theta 1 = \phi 1$ and $\theta 2 = \phi 2$.

19. The mirror device for a vehicle of claim 1, wherein the mirror device is mounted to a door portion of a vehicle, and is used for viewing a region substantially at a rear of the vehicle.

20. The mirror device for a vehicle of claim 1, wherein the mirror device is adapted for use in and mounting to at least a fender portion of a vehicle and a vehicle interior.

* * * * *